United States Patent [19]

McCunn et al.

[11] Patent Number: 5,060,701
[45] Date of Patent: Oct. 29, 1991

[54] CLOSED GRANULAR CHEMICAL HANDLING SYSTEM

[75] Inventors: Myron L. McCunn, Orion, Ill.; Donald K. Landphair, Bettendorf, Iowa; Richard M. Neyrinck, Port Byron, Ill.; Richard A. DePauw, Moline, Ill.; William R. Lundie, East Moline, Ill.; Douglas P. Brown, Bettendorf, Iowa; Jeffrey A. Hoffman, Westerville, Ohio; Frank D. Tenne, Ivyland, Pa.; Patrick D. Holverson, Ahwatukee, Ark.; Keith Woodruff, Mountainside, N.J.

[73] Assignee: Deere & Company, Moline, Ill.

[21] Appl. No.: 530,705

[22] Filed: May 30, 1990

Related U.S. Application Data

[62] Division of Ser. No. 329,469, Mar. 27, 1989, abandoned.

[51] Int. Cl.⁵ .............................................. B65D 88/54
[52] U.S. Cl. ....................................... 141/21; 141/346; 141/349; 141/351; 141/364; 239/148; 239/651; 137/614.04
[58] Field of Search ................ 141/2, 18, 21, 363–366, 141/231, 346, 347, 348, 349, 351, 353, 354, 356; 239/148, 172, 651, 352; 222/325, 608, 610; 137/614.02–614.04

[56] References Cited

U.S. PATENT DOCUMENTS

| | | | |
|---|---|---|---|
| 1,257,910 | 2/1918 | Meves | 222/181 |
| 1,934,197 | 12/1932 | MacKay et al. | 222/501 |
| 2,128,488 | 8/1938 | Koerner | 141/104 |
| 2,182,878 | 12/1939 | Pipenhagen | 222/449 |
| 2,210,206 | 11/1939 | Fisher | 401/206 |
| 2,665,926 | 1/1954 | Fraser | 137/614.02 |
| 2,719,754 | 10/1955 | Weller | 222/610 |
| 2,792,255 | 5/1957 | Bellows | 239/172 |
| 3,123,107 | 3/1964 | Kappler | 141/352 |
| 3,187,965 | 6/1965 | Bourget | 222/518 |
| 3,296,649 | 1/1967 | Schwartzman | 401/206 |
| 3,446,403 | 5/1969 | Serio | 222/158 |
| 3,543,814 | 12/1970 | Aluotto | 141/335 |
| 3,544,010 | 12/1970 | Jurdyc | 239/172 X |
| 3,970,123 | 7/1976 | Poulton et al. | 141/351 |
| 4,026,336 | 5/1977 | Spies | 141/348 |
| 4,082,124 | 4/1978 | Jenkins | 141/231 X |
| 4,164,307 | 8/1979 | Imamura et al. | 222/182 |
| 4,186,783 | 2/1980 | Brandt | 141/18 |
| 4,244,522 | 1/1981 | Hartwig | 239/148 |
| 4,356,848 | 11/1982 | Spies | 141/349 |
| 4,473,016 | 9/1984 | Gust | 239/651 |
| 4,489,858 | 12/1984 | Pritchitt | 222/182 |
| 4,569,296 | 2/1986 | Miller et al. | 239/172 X |
| 4,582,229 | 4/1986 | Wolf | 222/288 |
| 4,892,117 | 1/1990 | Spalink et al. | 137/614.03 |
| 4,926,345 | 6/1990 | Nix | 137/614.03 |

FOREIGN PATENT DOCUMENTS

| | | | |
|---|---|---|---|
| 0318678 | 2/1957 | Switzerland | 137/614.03 |
| 0337373 | 5/1959 | Switzerland | 137/614.03 |
| 0505681 | 5/1939 | United Kingdom | 137/614.03 |
| 0555692 | 9/1943 | United Kingdom | 137/614.03 |

OTHER PUBLICATIONS

Advertising brochure, "New Product Information--Cross Auger", Unverferth Manufacturing Co. Inc., 1986.

Primary Examiner—Henry J. Recla
Assistant Examiner—Casey Jacyna

[57] ABSTRACT

A closed granular chemical handling system comprising a dispensing valve and a receiving valve. The dispensing valve and the receiving valve are automatically opened when the valves are coupled together, and are automatically closed when the valves are uncoupled from one another. The valves are configured so that the receiving valve always is the first to open and the last to close. The valves are driven together by a camming structure having a neutral portion that acts as a delay between the opening and closing of both values so as to allow granular material to flow from between the valves through the receiving valve.

5 Claims, 9 Drawing Sheets

CLOSED GRANULAR CHEMICAL HANDLING SYSTEM

This application is a division of application Ser. No. 329,469, filed 27 Mar. 1989 now abandoned.

BACKGROUND OF THE INVENTION

1. Field of the Invention:

The present invention is directed to a closed granular chemical handling system having a dispensing valve mounted to a chemical package and a receiving valve mounted to an application means. When the two valves are coupled to one another they automatically open to provide a path through which chemical can flow from the package to the application means. In addition, when the two valves are uncoupled from one another they both automatically close.

2. Description of the Prior Art:

Agricultural planters are used for planting seeds in a field. Typically seeds are stored in a hopper and are dispensed from the hopper by a seed meter. To minimize the number of passes a farmer is required to make, a planter is typically provided with additional hoppers for holding fertilizer or granular chemical pesticides. These hoppers are provided with chemical meters for controlling the flow of fertilizer and pesticide onto the field.

Some planters having a plurality of planting units are provided with a cross auger for directing granular fertilizer from a side loading point to individual hoppers. Liquid fertilizers have also been directed to individual tanks on a planter. In the liquid fertilizer system, as disclosed in U.S. Pat. No. 4,244,522, to Hartwig, liquid fertilizer in a mobile tanker is pumped through a hose to a manifold located on the planter. The hose is coupled to the planter at a coupling valve.

In many instances it is desirable for agricultural workers not to directly handle certain agricultural treatment agents, such as herbicides, insecticides or fertilizers. These agricultural treatment agents are typically delivered to the agricultural workers in sealed containers which must be opened to direct the chemicals to the hopper located on the planter.

To minimize exposure to these chemicals, many times it is recommended for agricultural workers to wear various items of protective clothing, such as rubber gloves and respirators, when loading the planter with these chemicals. After a planting operation, some of the chemical packages may still contain unused chemicals. The empty packages and the remaining chemical must be stored or disposed of in an approved method.

Typical valve systems for controlling the feed of a product from a container are disclosed in the following U.S. Pat. Nos.: 4,489,858, to Pritchitt, 4,164,307, to Inamura et al, 3,543,814, to Aluotto, 3,446,403, to Serio, 3,296,649, to Schwartzman, 3,187,965, to Bourget, 2,975,465, to Lerner et al, 2,210,206, to Fisher, 2,182,878, to Oipenhagen, 1,934,197, to Mackay et al, and 1,257,910, to Meves. The devices disclosed in the above-identified patents illustrate container valve assemblies mounted to the discharge openings of their respective containers for controlling the discharge of diverse materials such as powders, powdered soap, cleaning fluid, cosmetics, shoe polish, milk, coffee, and toner for copying machines. The Pipenhagen patent is of particular interest in that it discloses a portable container and valve system for manually applying granular agricultural materials, such as fertilizers, in a home gardening procedure.

None of the devices disclosed in the above identified patents are directed to a safe handling system for large scale application of commercial quantities of granular agricultural treatment material from a container. Moreover, the devices disclosed by the above-identified patents do not teach or suggest a system in which a dispensing valve assembly is adapted to interact with a complimentary receiving valve assembly on a hopper to assure that product will not flow from the container until the container is properly mounted to the hopper structure. The prior art does not recognize a system in which a dispensing valve interacts with a hopper mounted receiving valve having a time delay between the opening and closing of the valves to assure proper flow of the product and prevent leakage of the product before the container is removed from the hopper.

SUMMARY

A closed handling system for a chemical product comprising two valves, a dispensing valve and a receiving valve. Both valves are spring biased into a closed position. The valves automatically open when the dispensing valve is properly coupled to the receiving valve. When uncoupling the dispensing valve from the receiving valve both valves automatically close. A sequencing means opens the receiving valve first and closes the receiving valve last during coupling and uncoupling operations. A delay means delays the uncoupling of the valves so that the granular material has time to clear the valve structures and enter the open receiving valve.

The dispensing valve is mounted on a chemical package. The dispensing valve comprises a housing having a passage located inside the package and a sliding tubular portion located inside the housing. The housing is also provided with a first valve seat that cooperates with the sliding tubular portion to seal the valve and thereby the chemical package. A biasing spring is positioned between the tubular portion and the housing for biasing the tubular portion into contact with the first valve seat. The tubular portion is provided with a guide post that cooperates with a guide aperture formed in the housing for guiding the vertical movement of the tubular portion.

The receiving valve is mounted on an application means, such as a granular chemical hopper for an agricultural planter. The receiving valve comprises a stationary valve disc and a slidable sleeve having a valve seat that contacts the valve disc. The stationary valve disc is mounted to a tower that projects upwardly from the hopper. The tower is located inside the slidable sleeve and defines passages through which a granular chemical can flow. The slidable sleeve is provided with a conical baffle that overlies a conical portion located on the hopper. A dust seal is mounted to the conical portion for wiping contact with the slidable sleeve. A biasing spring is positioned between the conical baffle and the conical portion for biasing the slidable sleeve towards the stationary disc.

The receiving valve is provided with an outer cup having upstanding walls and inwardly projecting lugs. The dispensing valve is provided with an inner cup having camming grooves. The inner cup is telescopically received in the outer cup of the receiving valve when coupling the valves together. The inwardly projecting lugs of the outer cup engage the camming grooves of the inner cup for driving the dispensing valve towards the receiving valve, as the valves are rotated relative to one another.

When coupling the valves to one another, the dispensing valve is positioned over the receiving valve and the cups are telescopically joined together. The dispensing valve is then rotated so that the inwardly projecting lugs on the outer cup engage the camming grooves on the inner cup driving the dispensing valve towards the receiving valve. As the dispensing valve is driven towards the receiving valve the inner cup engages the conical baffle of the receiving valve and drives it downwardly away from the stationary disc opening the receiving valve. After the receiving valve is opened, the dispensing valve is still closed. A closed conduit is formed between the dispensing valve and the receiving valve by the valve seat of the receiving valve engaging a second dispensing valve seat formed at the bottom of the dispensing valve housing. The dispensing valve is further rotated through a neutral portion of the camming groove, wherein the receiving valve remains open and the dispensing valve remains closed. As the dispensing valve is further rotated it encounters the opening portion of the camming groove where the dispensing valve is driven downwards towards the receiving valve. During the opening portion of the camming groove, the stationary disc engages the bottom of the valve member driving it upwards into the housing and away from the first dispensing valve seat. By driving the valve member away from the valve seat the dispensing valve is opened and granular chemical material is free to pour from the chemical package through the dispensing and receiving valves into the hopper.

When uncoupling the dispensing valve from the receiving valve the process is reversed. The dispensing valve is rotated relative to the receiving valve driving the dispensing valve upwards away from the receiving valve. At first the dispensing valve encounters the opening portion of the camming groove and ascends relative to the receiving valve. The valve member engages the first dispensing valve seat closing the dispensing valve. During the neutral portion of the camming groove the dispensing valve remains closed and the receiving valve remains open. Granular material located in the closed conduit formed between the valves is allowed to flow through the closed conduit and receiving valve into the hopper. The neutral portion providing a time delay in which the material can flow through the closed conduit. As the dispensing valve is further rotated in an uncoupling manner the dispensing valve is again driven away from the receiving valve closing the receiving valve.

As the dispensing valve is being uncoupled from the receiving valve, the slidable sleeve rises towards the stationary disc. The slidable sleeve thereby establishes a new fill level in the hopper. Thereby providing additional room, in a full hopper, for granular chemical located in the closed conduit formed between the valves.

The valve member and the stationary disc are rotatively locked together by cooperating projections. Therefore as the dispensing valve is rotated relative to the receiving valve, the valve member and stationary disc are locked together in a stationary position thereby providing a wiping action on the valve seats further clearing the granular material from the closed conduit by wiping it into the receiving valve.

The neutral portion of the camming groove provides the delay means for delaying the closing of the receiving valve when uncoupling the valves. The delay means provides time for granular chemical material to fall through receiving valve into the hopper. In addition, the delay means increases the length of wiping contact of the valve member and the stationary disc with the valve seats. The delay means is formed by a level section of the camming groove. This level section requires the operator to rotate the dispensing valve, approximately 69 degrees, in a level configuration before further closing the receiving valve.

DETAILED DESCRIPTION

Figure 1:
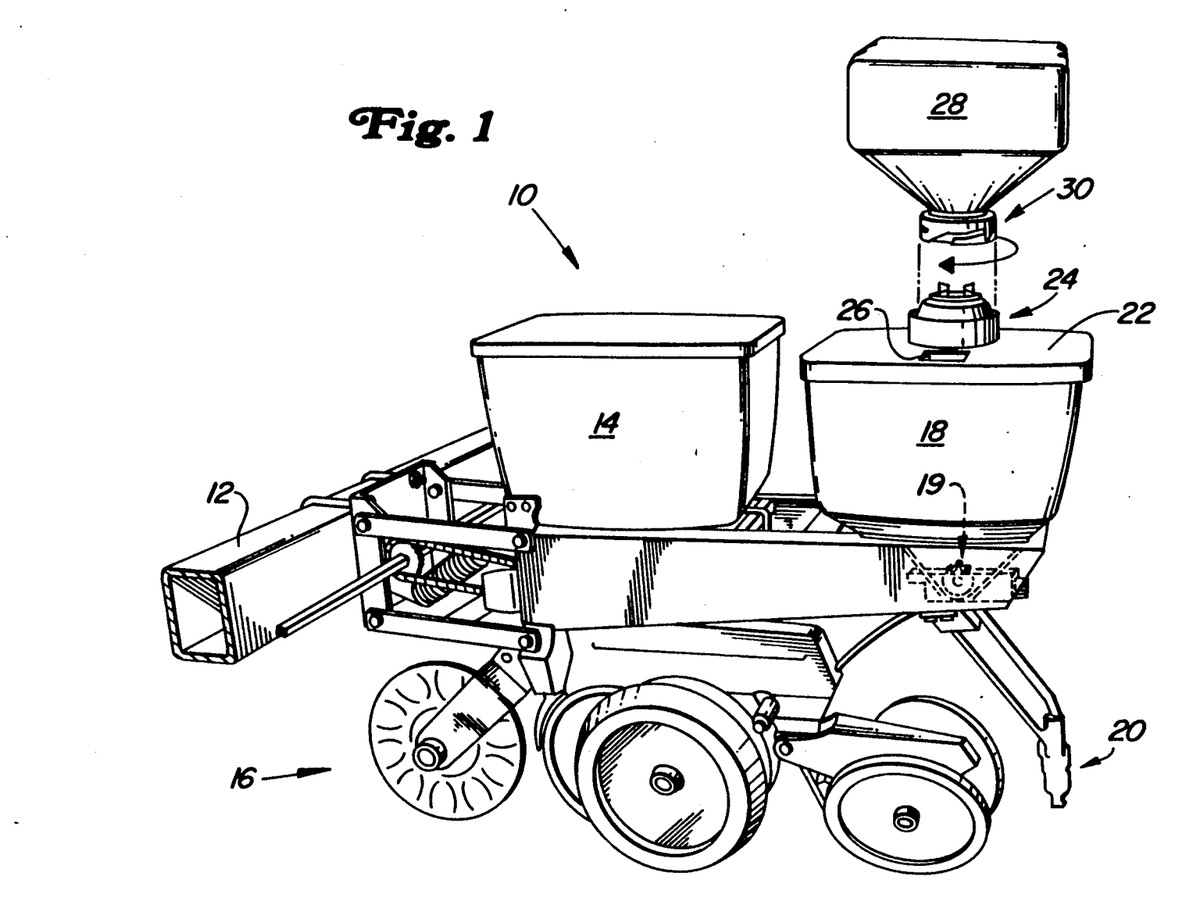
FIG. 1 is a perspective view of an agricultural planter having the subject closed granular chemical handling system.

FIG. 1 is a perspective view of a single planting unit 10 mounted on toolbar 12. The planting unit can be of a conventional configuration and as such will only be briefly discussed. The planting unit is provided with a seed hopper 14 which is coupled to a seed meter (not shown) which direct seed to planting assembly 16. The planting assembly forms a furrow into which the seed is inserted. The planting assembly then closes the furrow.

The planting unit is also provided with a granular chemical hopper 18 having a granular chemical meter 19, shown in phantom lines, for dispensing granular chemical to chemical applicator 20. The chemical meter can be of any conventional configuration, such as the one illustrated in U.S. Pat. No. 4,582,229, assigned to one of the assignees of the present invention, and which is incorporated herein by reference. Lid 22 of the chemical hopper is provided with a receiving valve 24. In addition, the lid is provided with window 26 for viewing the contents of the hopper.

The chemical material typically loaded into the chemical hopper includes pesticides (e.g., insecticides, herbicides and fungicides) which can be applied as granules. The granular material is normally composed of a pesticide and a carrier which is (a) sorptive such as clays, (b) non-sorptive such as sand and limestone, or (c) resin particulates or beads such as polyvinyl chloride particles.

To add chemicals to the hopper a granular chemical package 28 having dispensing valve 30 is coupled to the receiving valve. The dispensing valve is coupled to the receiving valve by applying the dispensing valve to the receiving valve in a twisting clockwise motion. Although the present invention is being described as coupling a chemical package to a hopper, the chemical package could also be directly coupled to a receiving valve located immediately upstream from the chemical meter. In such a configuration, the chemical package itself would form the chemical hopper for the planter. However, by providing the receiving valve on the detachable lid of the hopper the subject closed handling system is more easily retrofitted onto existing planters.

The subject closed granular chemical handling system can also be used for loading seed onto the planter. Chemicals may be directly applied to seed. In such applications, the seed could be added to the seed hopper using the present closed granular chemical handling system. When used in a seed application, the seed meter forms the metering valve and the planting assembly the application means.

The internal structure of the receiving valve and dispensing valve are best illustrated in FIGS. 2-5. The receiving valve is coupled to planter lid 22. The receiving valve comprises a stationary valve disc 32 that is mounted to tower 34. The tower comprises a cross shaped member which defines four passages through which granular chemical material can flow to the hopper. The receiving valve further comprises slidable sleeve 36 having conical baffle 38. The sleeve is provided with valve seat 40 which cooperates with stationary disc 32 to close the receiving valve. Biasing spring 42 is positioned between conical portion 44 and the underside of baffle 38 for driving the valve seat into contact with the stationary disc. The biasing spring is supported on landings 45 formed on the conical portion. Dust seal 47 is located between slidable sleeve 36 and conical portion 44. The dust seal is in wiping contact with the slidable sleeve to prevent dust and chemical granules from escaping from the hopper. The slidable sleeve has legs 46 that extend beneath the cross shaped members of the tower and are joined together by ring 48. The top of the stationary disc is provided with upwardly extending projections 49 which will be discussed in more detail below.

Figure 2:
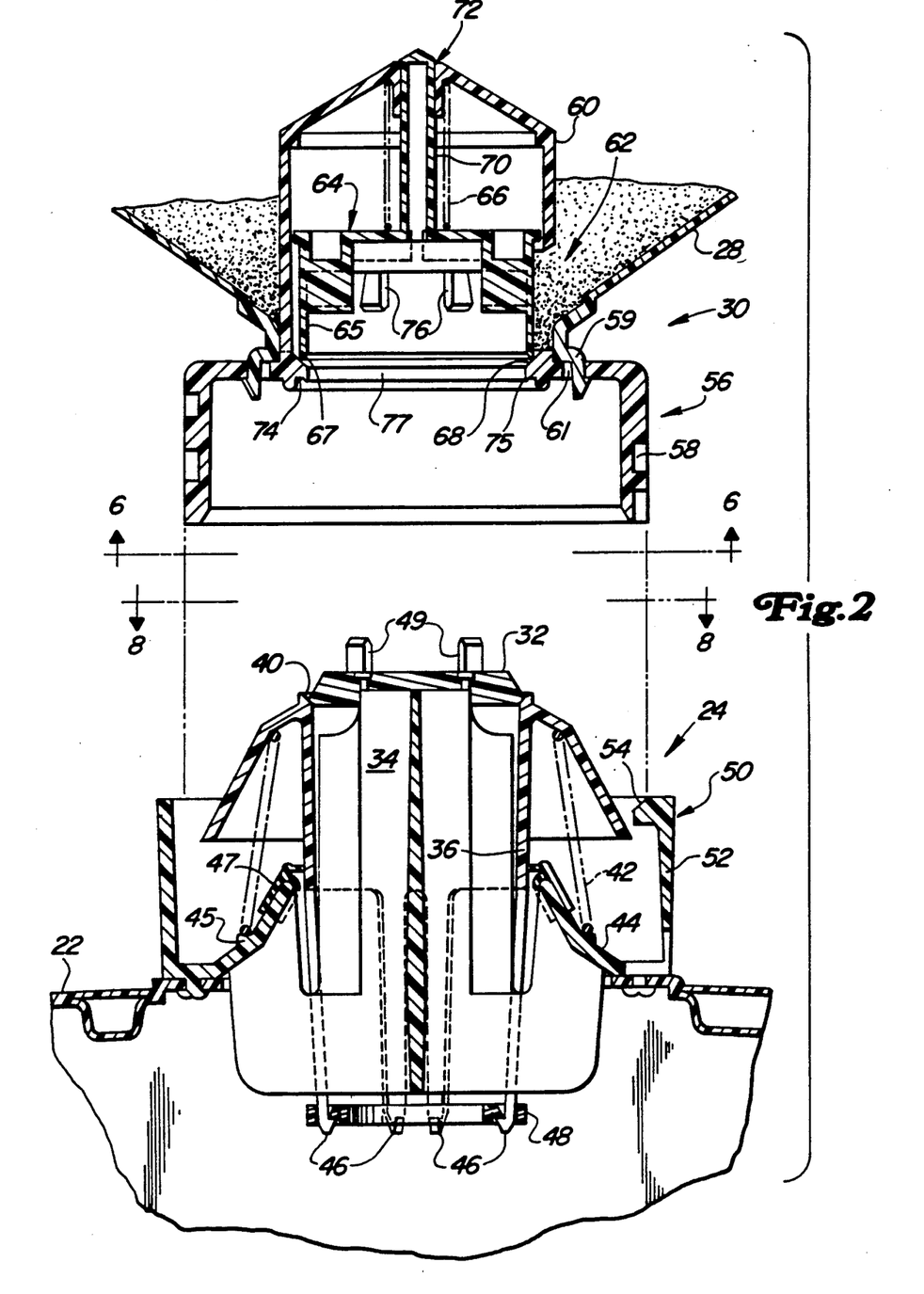
FIG. 2 is a cross sectional view of the dispensing and receiving valves.

The receiving valve is also provided with outer cup 50 having upstanding walls 52 that are provided with inwardly projecting lugs 54. The outer cup is used for coupling the dispensing valve to the receiving valve. The outer cup telescopically receives inner cup 56 of the dispensing valve. The inner cup of the dispensing valve is provided with camming grooves 58, better illustrated in FIG. 7, which engage lugs 54 for driving the dispensing valve downwardly towards the receiving valve.

Dispensing valve 30 is mounted to the dispensing nozzle of chemical package 28 by connector elements 59 which engage slots 61 formed in the dispensing valve. The dispensing valve forms the dispensing assembly for the package. The dispensing valve comprises housing 60 having passage 62. Slidable valve member 64 having tubular skirt 65 is located inside the housing. Valve member 64 is biased downwardly by spring 66 so that edge 67 of skirt 65 comes into contact with first valve seat 68. Valve seat 68 is inwardly canted to provide a sealing surface for outwardly canted edge 67. It has been found that it is desirable that edge 67 be a sharp edge so that it can cut through trapped granules when the valves are rotated through the neutral cam groove portion. The top of the valve member is provided with guide post 70 which cooperates with guide aperture 72 formed in housing 60 for guiding the vertical movement of the sliding valve member. Housing 60 forms an air pocket above valve member 64 so that granular chemical does not compact above member 64 preventing its opening.

Figure 3:
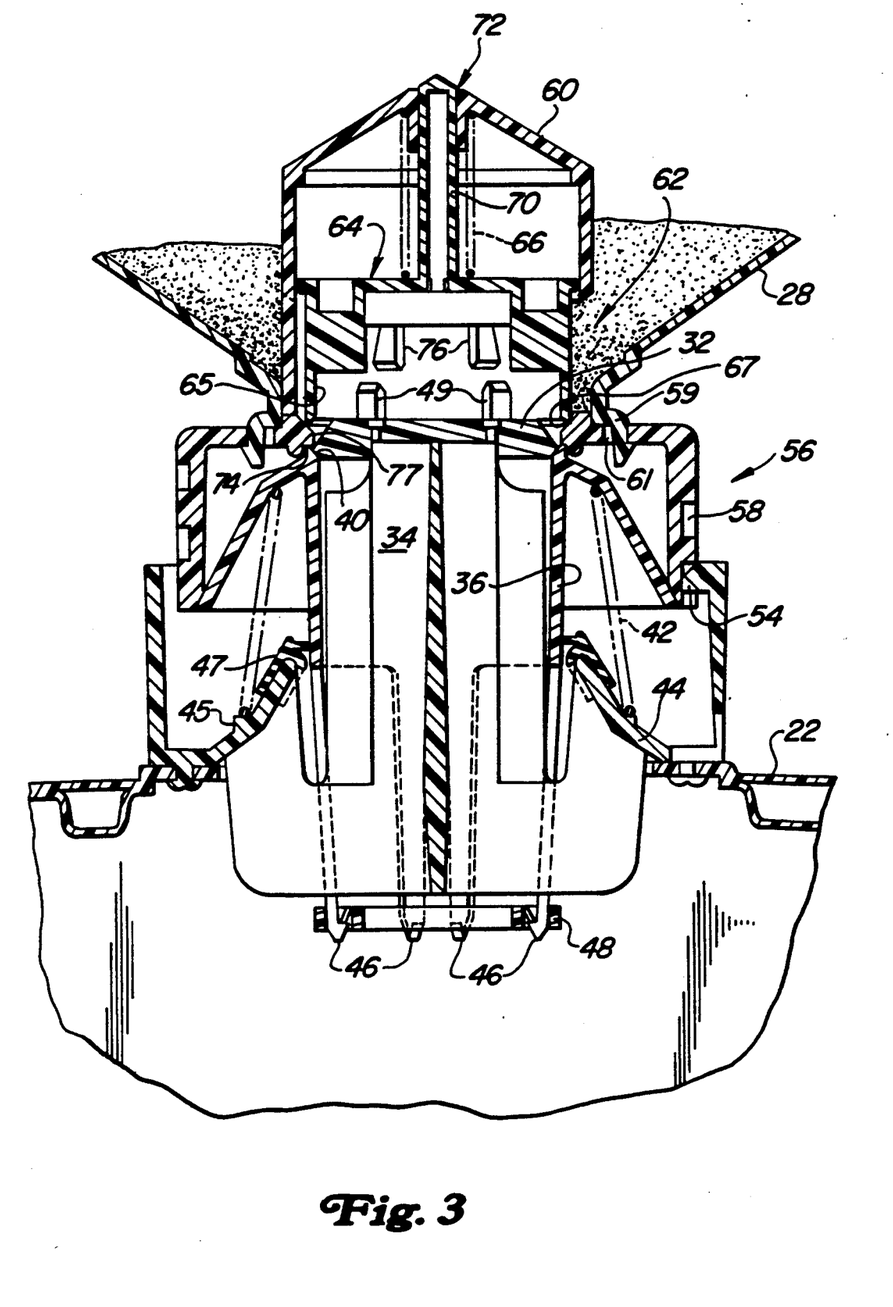
FIG. 3-5 are cross sectional views of the valve coupling and opening sequence.

As illustrated in FIG. 3, when the dispensing valve is initially coupled to the receiving valve, receiving valve seat 40 engages a second valve seat 74 located beneath first valve seat 68 of the dispensing valve. When receiving valve seat 40 engages second valve seat 74 it forms a closed conduit for granular chemical material flowing from the dispensing valve to the receiving valve. Second valve seat 74 is provided with an over lip 75, that shingles over receiving valve seat 40 to prevent chemical granules from lodging in the valve interface.

Dispensing valve 30 is provided with downwardly extending projections 76 which cooperate with upwardly extending projections 49 of receiving valve 24 to provide a locking means for preventing the rotation of valve member 64. This provides for a wiping action between valve member 64 and first dispensing valve seat 68 when dispensing valve 30 is being removed from receiving valve 24.

In removing the package from the planter, dispensing valve 30 is rotated counter clockwise relative to receiving valve 24. Cooperating projections 49 and 76 lock valve member 64 to the stationary disc 32 thereby causing relative rotation between first dispensing valve seat 68 and valve member 64. This wiping action aids in closing dispensing valve 30 by wiping trapped granules from between valve member 64 and valve seat 68. Stationary disc 32 wipes granules away from annular edge 77 of the dispensing valve and valve seat 40 of the receiving valve when it descends into a closed position.

Figure 4:
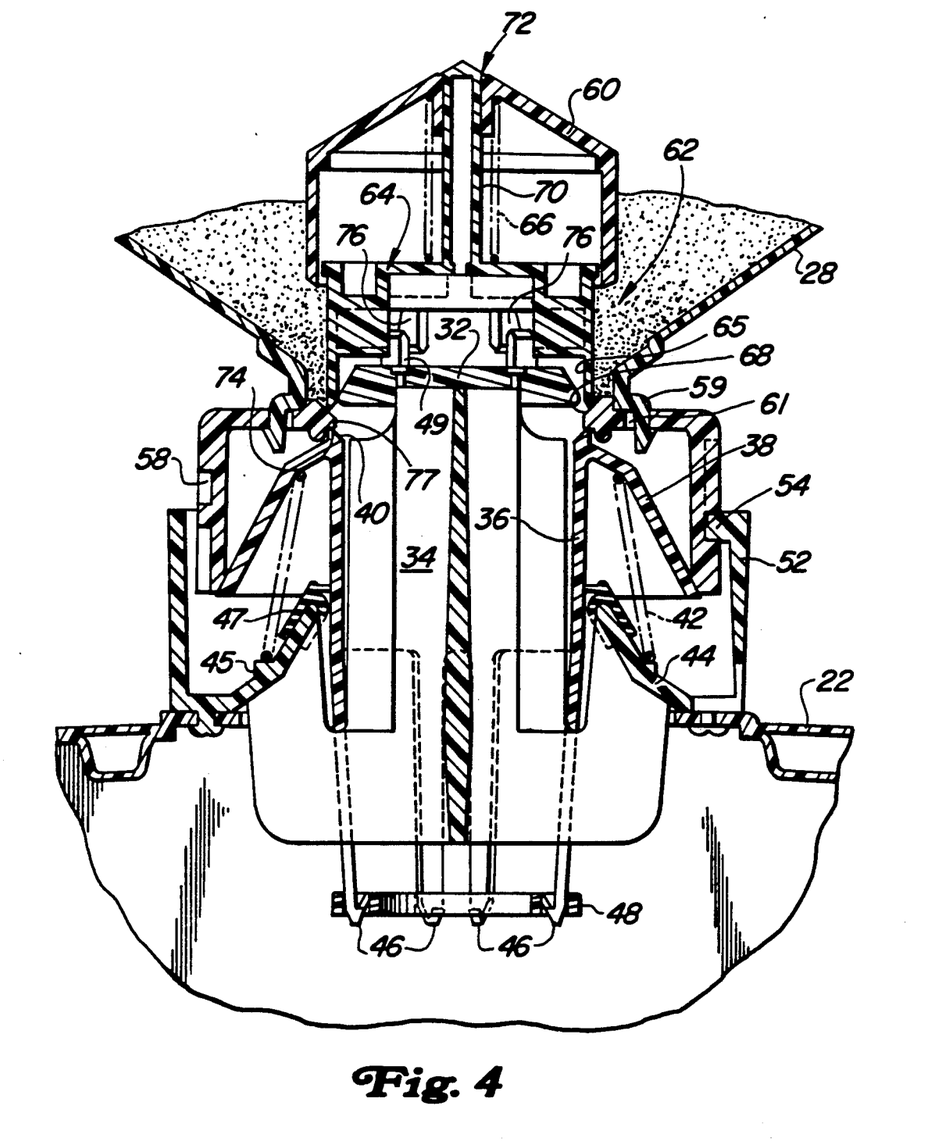
Figure 5:
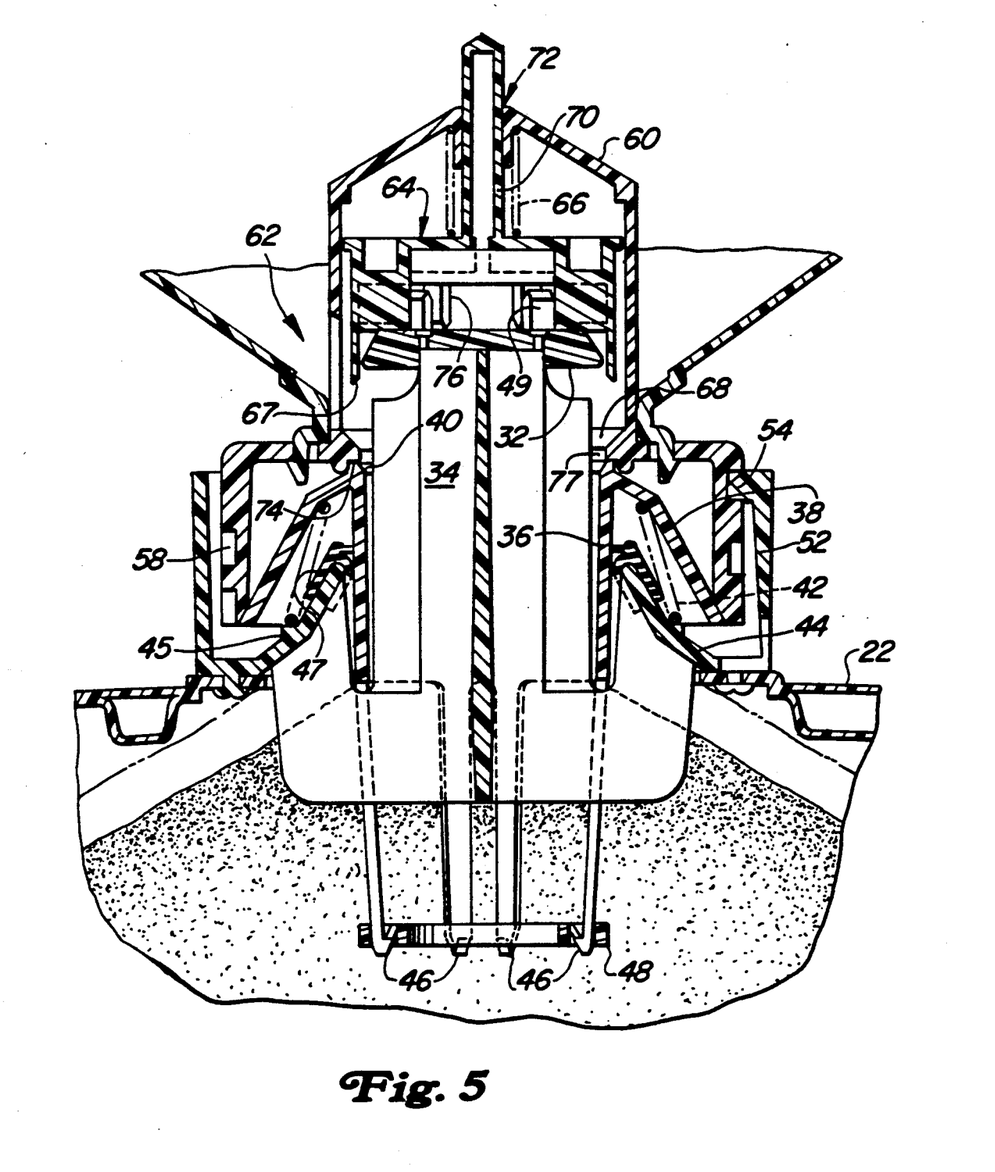
Figure 6:
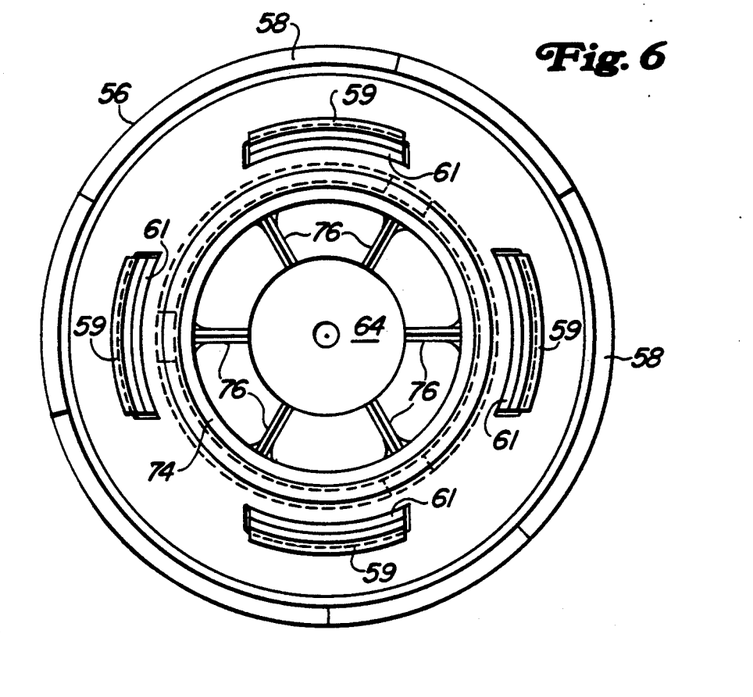
FIG. 6 is a bottom view of the dispensing valve taken along line 6—6 of FIG. 2.
Figure 7:
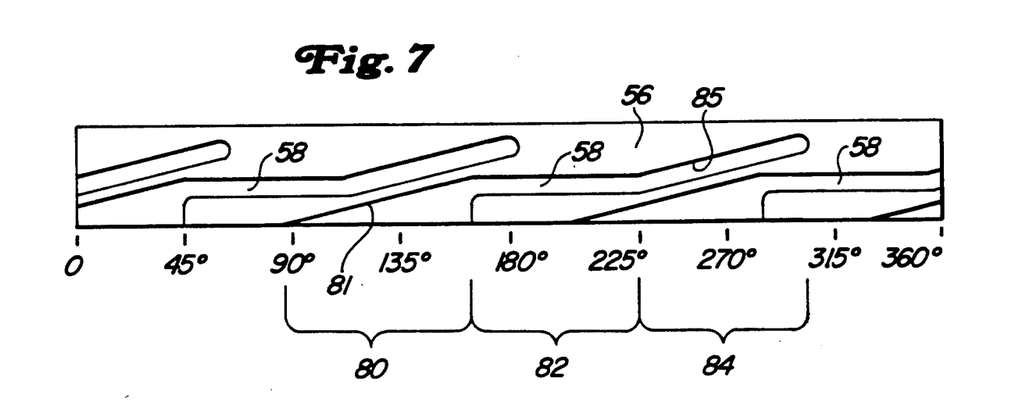
FIG. 7 is a flat view of the circular camming grooves.
Figure 8:
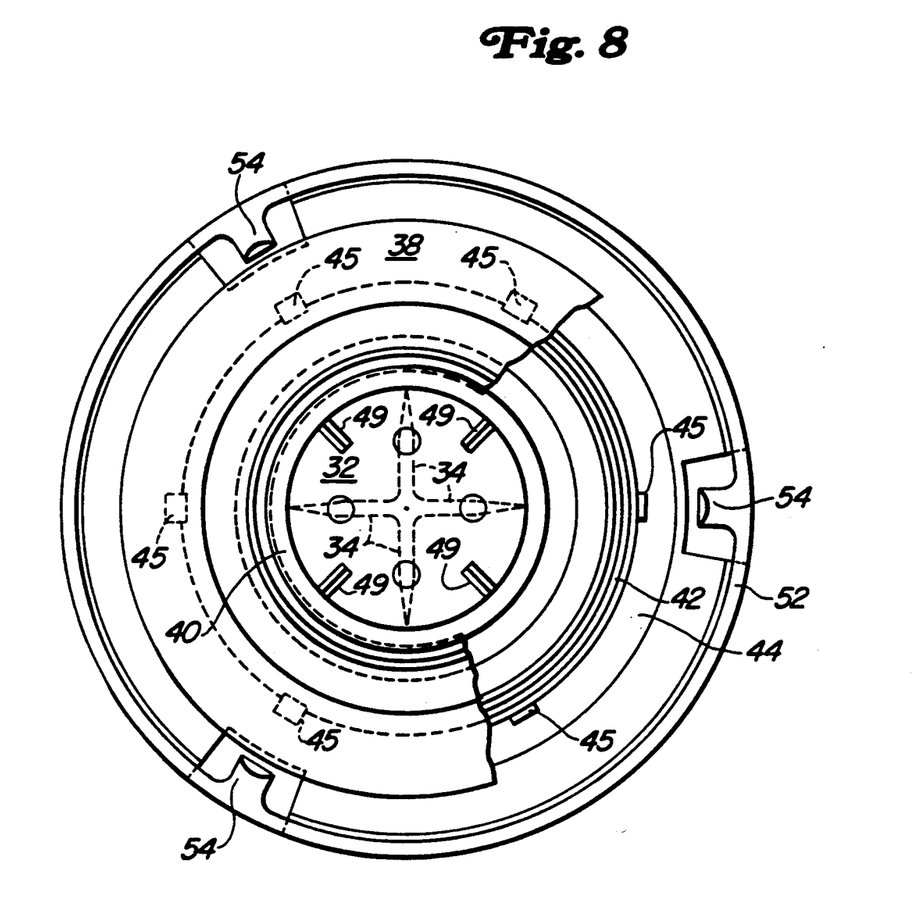
FIG. 8 is a top view of the dispensing valve taken along line 8—8 of FIG. 2.
Figure 9:
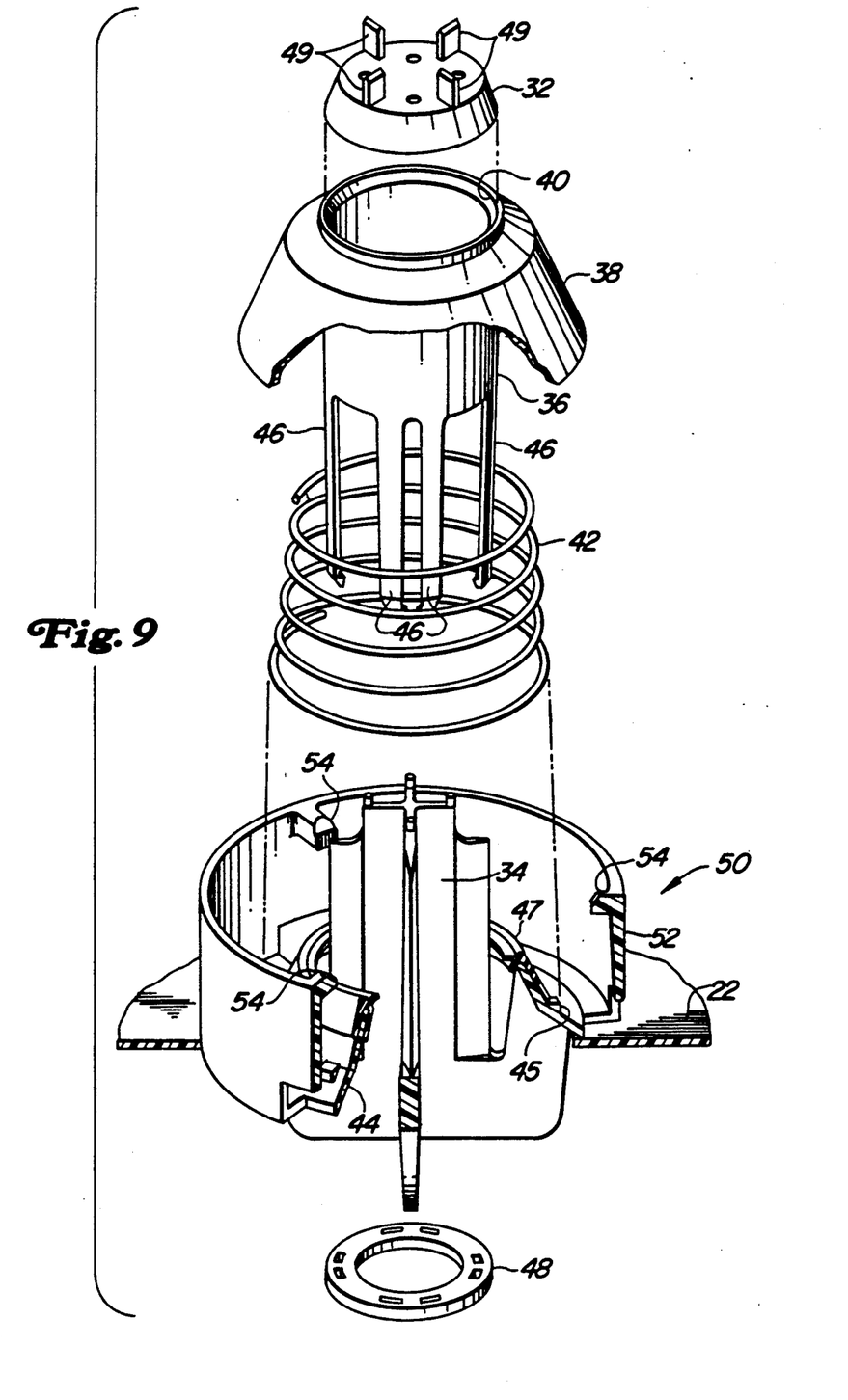
FIG. 9 is an exploded view of the receiving valve.
Figure 10:
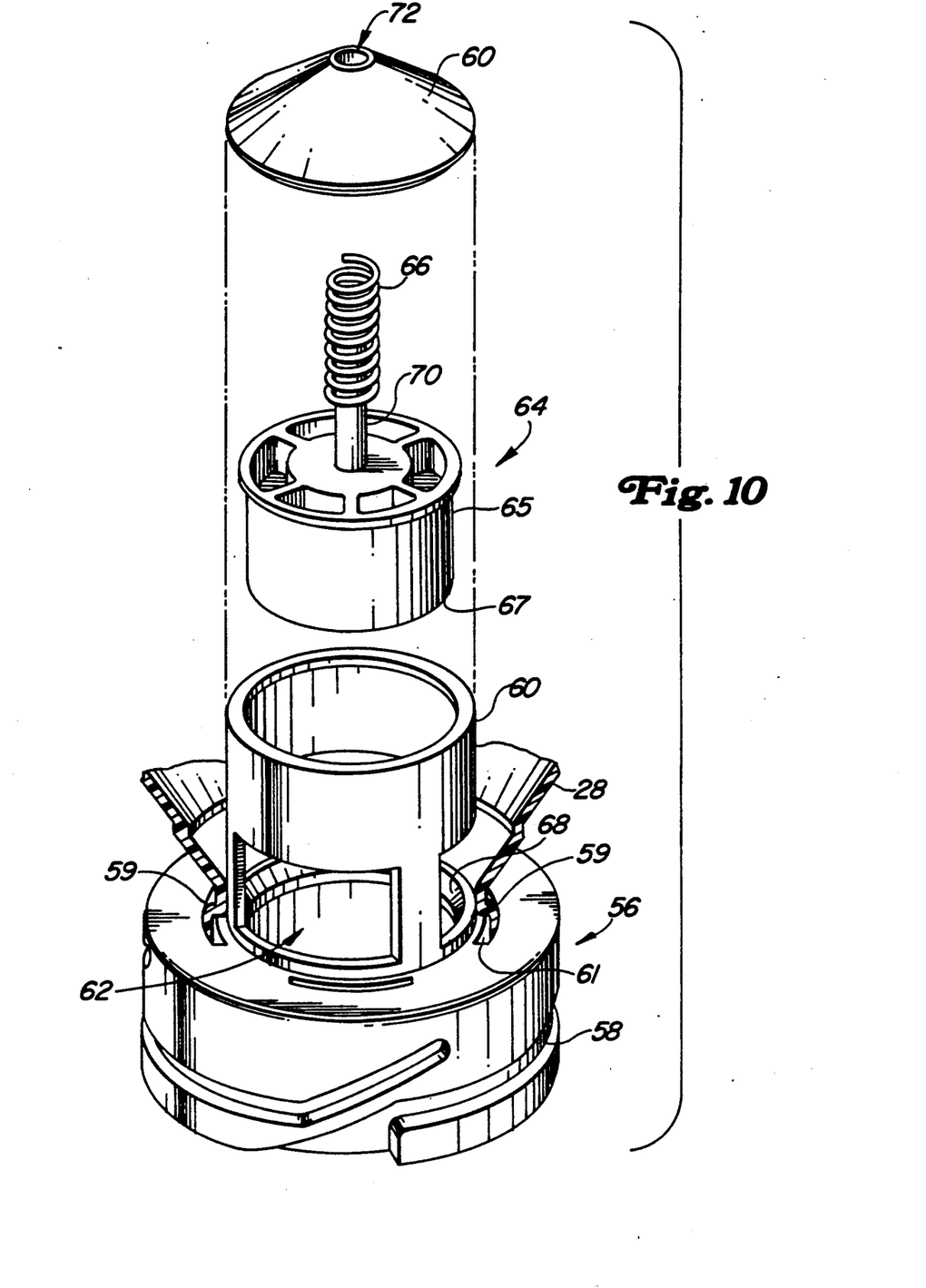
FIG. 10 is an exploded view of the dispensing valve.

Camming groove 58 of dispensing valve 30 is best illustrated in FIG. 7. The camming groove has three distinct portions: introduction portion 80, neutral portion 82 and opening portion 84. Introduction portion 80 is that portion where the lugs are introduced into the groove. During the introduction portion of the camming sequence, lug 54 enters introduction portion 80, as illustrated in FIG. 3. Ramp 81 of introduction portion 80 drives dispensing valve 30 downwardly against receiving valve 24. This downward movement initially opens receiving valve 24 and joins valve seat 40 to second dispensing valve seat 74, as illustrated in FIG. 4. Neutral portion 82 of the camming groove is substantially level. The neutral portion maintains the FIG. 4 configuration, that is the receiving valve is open and the dispensing valve is closed. In the neutral portion of the camming groove the dispensing valve is rotated approximately 69 degrees from the end of introduction portion 80 to the beginning of opening portion 84. This provides a delay means in which the granular material has time to fall through the valve structures during the removal operation. In addition, this delay increases the duration of the wiping action of valve member 64 and stationary disc 32. Opening portion 84 is provided with ramp 85 which further drives dispensing valve 30 downwardly against the receiving valve 24.

During the opening portion of the camming sequence stationary disc 32 contacts the underside of valve member 64 driving slidable portion 64 away from first dispensing valve seat 68. Granular material in package 28 is then free to fall through passage 62 into the passages formed by cross shaped tower 34.

During the package removal operation, the package is rotated through opening portion 84 driving dispensing valve 30 upwards away from receiving valve 24. When the lugs of the receiving valve reach the neutral portion or the camming grooves the valves are in the configuration illustrated in FIG. 4. Further rotation of dispensing valve 30 relative to receiving valve 24, through the neutral portion of the camming sequence, causes the wiping action between valve member 64 and first dispensing valve seat 68. After the lugs of the receiving valve 24 reach the introduction portion of the camming groove, receiving valve 24 is closed and the package can be removed.

Stationary disc 32 is received in tubular skirt 65 when slidable portion 64 is opened relative to valve seat 68. Therefore, whenever there is chemical flow through the dispensing valve, stationary disc 32 is elevated above valve edge 67 so that chemical granules are free to fall through the receiving valve as the dispensing valve is closing. In addition, as the dispensing valve closes slidable sleeve 36 moves upward allowing granular chemical in the closed conduit to flow away from the bottom of the sleeve into the hopper. This upward movement of the slidable sleeve facilitates the hopper accepting additional granular chemical located in the closed conduit when the hopper is full and the package is uncoupled.

It should be noted that lugs 54 and groove 58 can be arranged in a reversed configuration. That is, lugs 54 could be located on inner cup 56 and groove 58 located on outer cup 50.

Receiving valve 24 and dispensing valve 30 are arranged so that the receiving valve is the first to open and last to close. The overall structure of the valves comprises a sequencing means which ensures that granular material will not be prematurely spilled through the dispensing valve before the receiving valve is opened. Similarly, closing the dispensing valve first, permits granular material trapped between the valves time to flow through the receiving valve into the hopper before the valves are disconnected.

With the present invention, the package can be removed from the hopper while still partially filled with granular material and will be automatically sealed by the operation of the dispensing valve.

In using the present invention, a user first aligns the dispensing valve of the chemical package with the receiving valve of the application means. The user then couples the dispensing valve to the receiving valve. With the presently disclosed system the coupling operation comprises rotating the chemical container relative to the receiving valve, however other coupling methods could be used. The present invention then automatically opens the receiving valve and the dispensing valve. The opening of the two valves is sequenced so that the receiving valve is automatically opened first. The present invention delays the opening of the dispensing valve after the opening of the receiving valve by a predetermined coupling movement. In the above described invention, the predetermined coupling movement comprises rotating the dispensing valve approximately 69 degrees through the neutral portion of the camming groove. After the granular chemical has been emptied into the application means, the dispensing valve is uncoupled from the receiving valve. The dispensing valve and the receiving valve are automatically closed during the uncoupling operation. The closing is sequenced so that the dispensing valve is closed first and the receiving valve is closed last. In addition the closing of the receiving valve is delayed by the predetermined coupling movement so that granular material is allowed to flow from between the valves through the receiving valve and into the hopper. The valve seats of the receiving valve and the dispensing valve are wiped of granules during the delay.

In the preferred embodiment discussed above, the valves automatically open when correctly coupled to one another. However, the opening of the valves could be manually actuated after the valves are coupled to one another. Therefore, invention should not be limited by the above-described embodiment, but should be limited solely by the claims that follow.

We claim:

1. An agricultural unit comprising:
   a frame,
   a chemical hopper mounted to the frame for holding a dry granular chemical to be applied during an agricultural operation, the chemical hopper having a detachable lid for enclosing the hopper;
   application means mounted to the frame for applying a dry granular chemical during an agricultural operation;
   a dry granular chemical metering valve operatively associated with the chemical hopper and application means for controlling the flow of a dry granular chemical from the chemical hopper to the application means;
   a receiving valve mounted to the lid of the hopper for receiving a dry granular chemical from a chemical package, the receiving valve is biased closed and adapted to receive a cooperating dispensing valve on a chemical package.

2. An agricultural unit as defined by claim 1 wherein the receiving valve comprises a stationary valve disc and a slidable sleeve having a valve seat which contacts the disc, the receiving valve is opened by sliding the slidable sleeve away from the valve disc when the dispensing valve is coupled to the receiving valve.

3. An agricultural unit as defined by claim 1 wherein the stationary valve disc is mounted to a tower that projects upwardly from the hopper, the tower being located inside the slidable sleeve and defining passages through which a chemical can flow.

4. An agricultural unit as defined by claim 3 wherein the receiving valve is provided with a conical portion and the sliding sleeve is provided with a conical baffle that overlies the conical portion.

5. An agricultural unit as defined by claim 4 wherein a spring is positioned between the conical portion and the conical baffle for biasing the slidable sleeve upwardly into contact with the stationary valve disc.

* * * * *

UNITED STATES PATENT AND TRADEMARK OFFICE
CERTIFICATE OF CORRECTION

PATENT NO. : 5,060,701
DATED : 29 October 1991
INVENTOR(S) : Myron L. McCunn et al.

It is certified that error appears in the above-identified patent and that said Letters Patent is hereby corrected as shown below:

Column 8, line 23, delete "detachable"; line 43, delete "1" and insert therefore -- 2 -- .

Signed and Sealed this

Seventh Day of September, 1993

Attest:

BRUCE LEHMAN

*Attesting Officer*  *Commissioner of Patents and Trademarks*